W. T. LANGTON.
MEANS FOR APPLYING AND REMOVING ANTISKID DEVICES.
APPLICATION FILED NOV. 22, 1913.

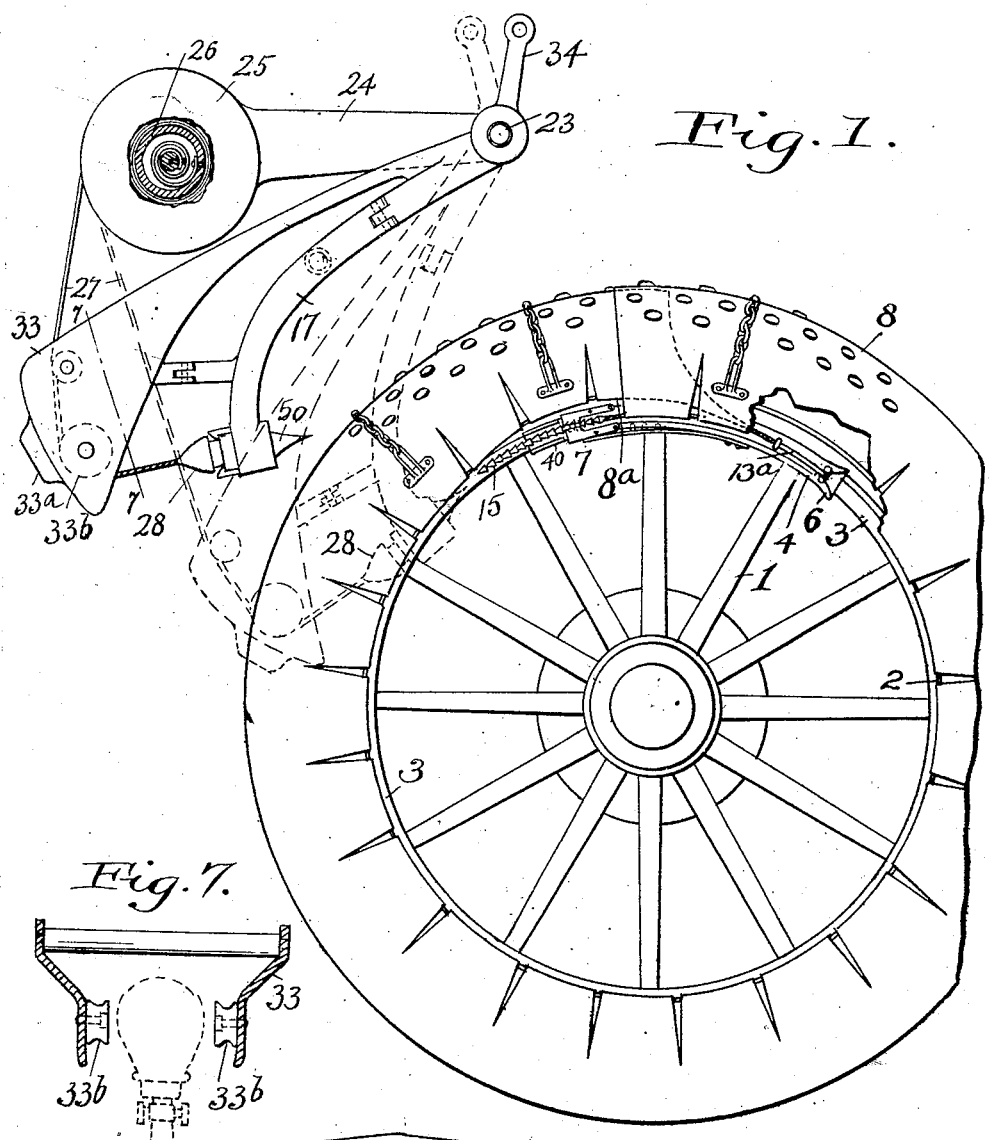

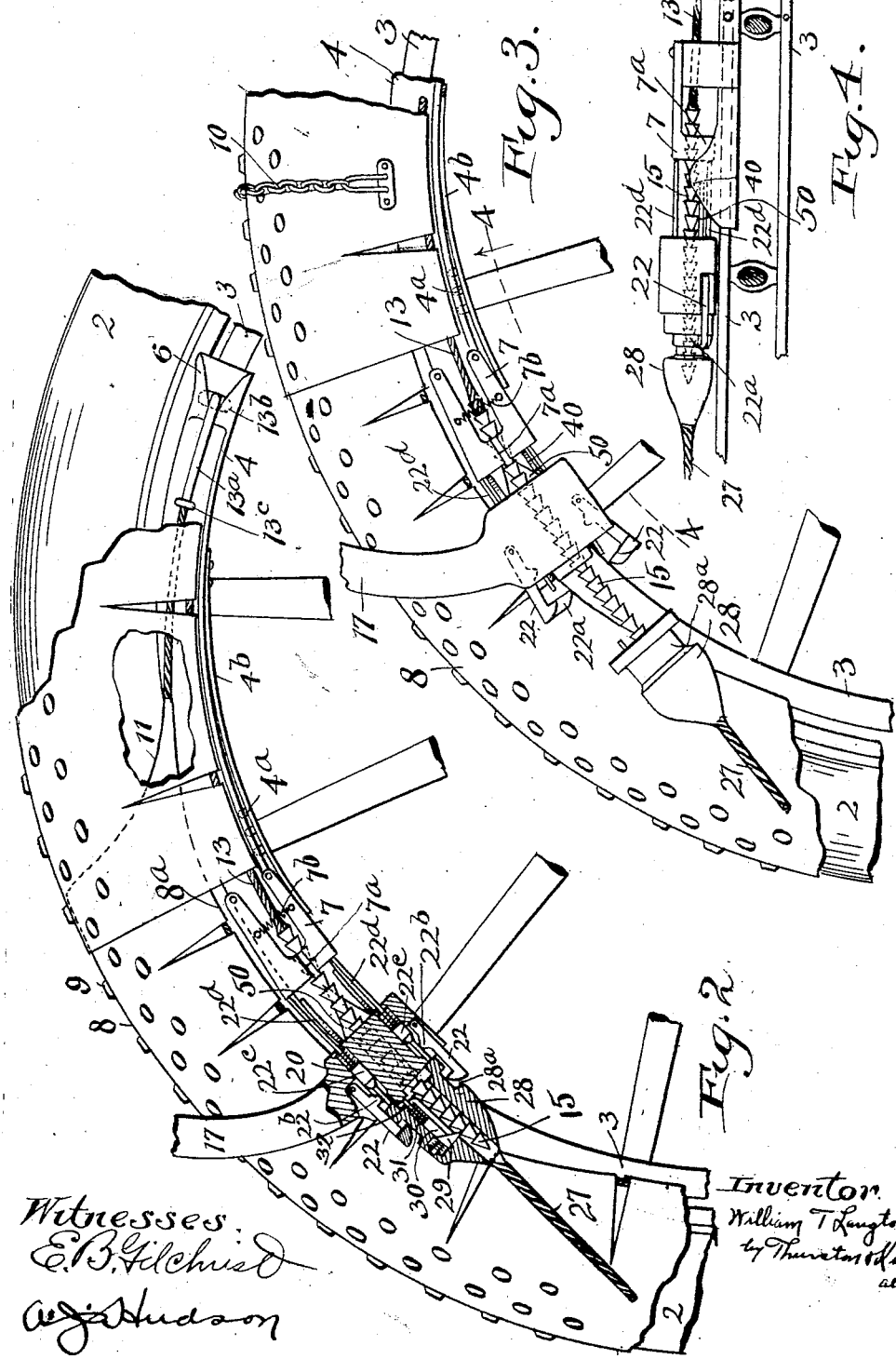

1,288,620.

Patented Dec. 24, 1918.
3 SHEETS—SHEET 3.

Witnesses
E. B. Gilchrist
A. J. Hudson

Inventor
William T. Langton
by Thurston & King
attys

UNITED STATES PATENT OFFICE.

WILLIAM T. LANGTON, OF CLEVELAND, OHIO, ASSIGNOR OF FORTY ONE-HUNDREDTHS TO ARTHUR J. HUDSON, OF CLEVELAND, OHIO.

MEANS FOR APPLYING AND REMOVING ANTISKID DEVICES.

1,288,620.

Specification of Letters Patent.   Patented Dec. 24, 1918.

Application filed November 22, 1913. Serial No. 802,355.

*To all whom it may concern:*

Be it known that I, WILLIAM T. LANGTON, a citizen of the United States, residing at Cleveland, in the county of Cuyahoga and State of Ohio, have invented a certain new and useful Improvement in Means for Applying and Removing Antiskid Devices, of which the following is a full, clear, and exact description.

This invention relates to a device for use on automobiles, and has for its object to provide a means and mechanism for placing an anti-skid or traction device, as they are sometimes called, upon one or more wheels of a vehicle, the placing of the device being practically automatically accomplished, as well as the retrieving of the device from the wheel.

Generally speaking, the invention comprises the elements and combinations thereof set forth in the accompanying claims.

Figure 5:
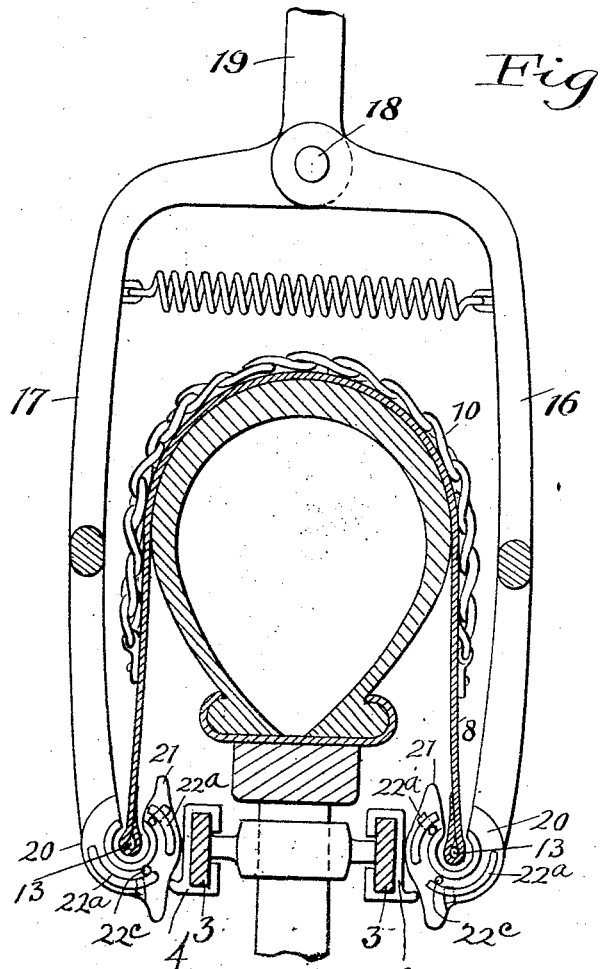
Figure 6:
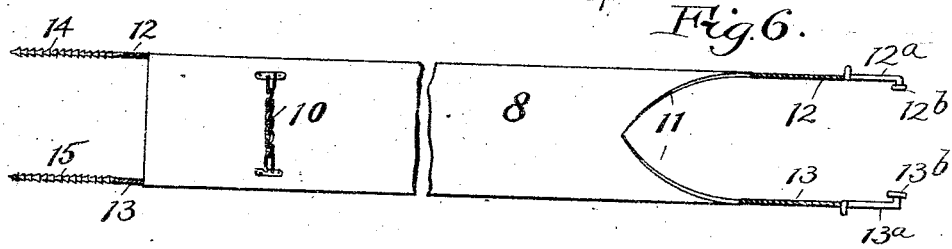

Reference should be had to the accompanying drawings forming a part of this specification, in which Figure 1 is a side elevation of a vehicle wheel, showing my device in its relationship thereto. Fig. 2 is an elevation of a portion of a wheel showing the front and rear portions of the anti-skid device in their relationship to the wheel. Fig. 3 is an elevation, similar to Fig 2, showing the relationship of the parts, as the anti-skid device is being taken from the wheel. Fig. 4 is a section on the line 4—4 of Fig. 3. Fig. 5 is a vertical section transversely through the wheel showing the means for introducing the anti-skid device to the wheel, and for moving it therefrom. Fig. 6 represents in broken plan a development of the anti-skid device. Fig. 7 is a sectional elevation of the part shown in Fig. 8 and Fig. 8 is a front elevation of the lower part of the device for introducing the anti-skid device to the tire.

Some sort of an anti-skid device or traction device is practically a necessity, which must be used in connection with one or more of the wheels of a motor vehicle. I believe that this needs no argument, and I will therefore not discuss it further.

However, the use of the anti-skid device is confined to certain times when it is necessary to produce traction between the wheel and the ground, as on a muddy or snow covered road, or when in deep sand, and the use of chains at any other time would not be at all desirable, inasmuch as it will at once appear that they, to a certain extent, result in retarding the motion of the vehicle and, by so much, cut down its efficiency with respect to the use of gasolene. At such times, as it is necessary to put on a traction device, the procedure is to jack up the car to free the wheel upon which the device is to be put preliminary to putting the traction device upon the wheel. The accomplishment of this is more or less troublesome, particularly if it be necessary to do this in the open air or when it is raining.

The device of this invention permits an anti-skid device to be placed upon the wheel by bringing the mechanism for introducing the same in juxtaposition to the wheel, and in causing the car to move forward slowly, during which time the anti-skid device is drawn from a suitable container and automatically secured upon the wheel. Conversely, when it is desired to remove the anti-skid device from the wheel, the same mechanism which is used for introducing the anti-skid device is brought into proper position with respect to the tire, and the wheel is slowly backed. Whereupon the anti-skid device will be removed from the wheel, the manner of operation appearing at length in this specification.

At 1 is represented a wheel which is of the ordinary type used with automobiles, and carries a pneumatic tire, as represented at 2. Carried upon the wheel and fastened thereto so as to be positioned just below the felly of the wheel, is an annular frame which is represented at 3. In the particular instance, the frame is fastened to the spokes, although it will appear that other fastenings of the frame may be made with equal facility.

Upon a portion of this frame is mounted a sleeve which conforms to a portion of the member 3. This sleeve is illustrated at 4 in Fig. 2, perhaps more clearly than in the other views. This sleeve, as heretofore stated, extends only throughout a portion of the length of the member 3, and upon it are mounted the several instumentalities which are carried by the wheel for receiving and holding the opposite ends of the anti-skid device when the same is in position upon the wheel.

The instrumentalities consist first, in a throated member 6, the same being provided with a V-shaped throat as illustrated in Fig. 2, and is adapted to receive a hook attached to the forward end of the anti-skid device, as will be later explained. The other instrumentality carried by the sleeve 4 is the pair of pivoted jaws illustrated at 7 in Fig. 2. These jaws as will be seen, are pivoted upon the sleeve 4, and at their forward ends are provided with heads $7^a$ which are adapted to receive a ratcheted member extending from the rear portion of the anti-skid device. The jaws are spring-pressed together by means of a spring $7^b$, as will be clearly seen.

The anti-skid device which is used, may assume a variety of forms, and I do not limit myself to the particular form herein shown, except in so far as it relates to those portions whereby the same is introduced upon the wheel and held thereon.

The anti-skid device is shown in Fig. 6, and comprises a body portion 8, which may be made of canvas or leather, and, if desired, this canvas or leather may be provided with a series of knobs such as illustrated at 9 in Figs. 2 and 3. It will also preferably be provided with chains 10 extending throughout a portion of the transverse dimensions thereof, and secured upon the body 8. The body 8 at its forward portion is cut back on an angle, such as illustrated at 11 in Fig. 6, and suggested in the dotted line 11, shown in Fig. 2. The lower edges of the body portion 8 are secured to cables 12 and 13, which at their forward ends are each provided with hooks $12^a$ and $13^a$ that have inwardly extending heads that are flanged, as indicated at $12^b$ and $13^b$, and as shown in dotted lines at $13^b$ in Fig. 2. As will be clear from Fig. 2, the flanged heads of these hooks are adapted to be received into the throated portion of the member 6, and the particular formation of the throat causes these flanged heads of the members $12^a$ and $13^a$ to be securely held.

The rear portion of the cables 12 and 13 are provided with members 14 and 15, which are formed with ratchet teeth thereon, these ratchet members being adapted to be grasped by the jaws 7 when the last part of the anti-skid device has been introduced upon the wheel.

The body 8 of the anti-skid device is of suitable width, so as to extend over the tire of the wheel, and down upon the sides, to be in proper position with respect to the instrumentalities 6 and 7, which receive and hold the anti-skid device upon the wheel.

The mechanism and device for introducing the anti-skid device to the wheel and again receiving it from the wheel, is shown in elevation in Fig. 5. This comprises a pair of pivoted arms 16 and 17, which as will be seen, are pivoted at 18 upon a support 19. At the lower portion, the arms are provided with heads having jaws 20 and 21.

Upon the rear side of each of the jaws 20 and 21 are mounted a pair of pawls 22. These pawls are provided with extended heads, such as illustrated at $22^a$, shown in Fig. 5, and are adapted to engage with the head 28 carried by the cable which retrieves the anti-skid device from the wheel.

Each of the pawls 22 is provided with an extending nose $22^b$ which lies in the path of a plunger $22^c$ that operates in a guiding opening in the head 20. The plunger $22^c$ is spring pressed to normally keep the plunger out of engagement with nose $22^b$. Each plunger is provided with a stem $22^d$ that extends without the head 20 and lies in the path of the jaws 7 when the wheel is rotating in a counter clockwise direction. The forward part of the jaws 7 will, under the above conditions, engage the stems $22^d$ upon the heads 20, pressing them inwardly against the action of the springs which engage them and cause the inclined shoulders upon plungers $22^c$ to engage the noses $22^b$ upon pawls 22, thereby causing these pawls to be moved outwardly and release the beads 28.

The forward portion of the jaws 20, 21, are provided with a V-shaped extension 50, which is adapted to engage with the jaws 7 to open the same and to release the ratcheted portions 14 and 15 carried by cables 12 and 13, when the anti-skid device is being retrieved from the wheel.

The support 19 is pivotally mounted at 23 upon an arm 24, the arm 24 carrying a container 25, which has a spring pressed drum 26 therein,—the spring being placed under tension as the anti-skid device is drawn from the casing so that the anti-skid device will be again drawn into the casing, when the anti-skid device is being retrieved from the wheel.

Secured to the drum 26 are cables, one of which is represented at 27. The cable is of sufficient length to extend from the casing 25 to coöperate with the arms 16 and 17 of the mechanism for introducing the anti-skid device to the wheel. These cables at their forward ends are provided with heads, one of which is shown at 28. The head 28 is provided with a central opening which is adapted to receive the ratcheted portion 15 of the anti-skid device, and means is provided for engaging this ratcheted portion to hold the same. This holding means comprises a wedge shaped tooth 29 which is spring pressed, as will be seen in Fig. 2, the same engaging with the ratchet member 15, and holding the same with respect to the member 28. For the purpose of releasing the pawl or tooth 29, which, as will be seen is cam-shaped upon its lower face, there is a cam-shaped plug 30 engaging with the member 29. This member 30 is held by a spring 31, normally out of engagement with the tooth 29. A push bar 32 is secured to the member 30 and extends outside of the head 28, and is adapted to be engaged by the head 20, 21, upon the arm 17, when the head 28 contacts with the head 20, as the anti-skid device is being introduced to the wheel. This engagement releases the ratcheted portions 14, 15, of the anti-skid device.

For the purpose of positioning the arms 16 and 17 properly with respect to the tire, I employ a member which is generally represented at 33. This member is supported upon the same pivot as is the support 19 and the member comprises a head portion which is adapted to straddle the tire, and at the rear portion 33$^a$ is of such contour as to just engage the tire, forming in effect a scraper, while simultaneously causing the levers 16 and 17 to assume a correct position, with respect to the tire. The head 33 also carries the rollers 33$^b$ which are adapted to guide the cables 12 and 13 of the anti-skid device, as well as the cables which are fastened to the end thereof, one of which cables is represented at 27.

The movable members 33 and the arms 16 and 17 are manipulated by a lever 34, which is adapted to be operated by the driver of the car from his position in the car. This mechanism is not shown or claimed, and might be embodied in any mechanism by which the portions pivoted at 23 could be moved into and out of relationship with respect to the tire on the wheel.

We may assume in the first instance, that the anti-skid device is upon the drum 26, in the casing 25. Under such conditions the cables 27 are, through the mechanism contained in beads 28, secured to the ratchet ends 15 of the anti-skid device, and all, i. e. cables 26 and the forward portion of the cables which are attached to hooks 13$^a$ extends from the casing 25 to the heads 20, 21 of the arms 16, 17; while the hooks 13$^a$ extend forwardly from the heads 20, 21. These hooks as appear in Fig. 2 are provided with heads 13$^b$ which are just large enough to prevent the hooks passing through the jaws 20, 21, of the head and further holds the flanged end of hooks 13$^a$ a sufficient distance in front of the heads that there will be no danger of the hooks interfering with the desired operation of stems 22$^d$.

If it be desired to introduce the anti-skid device upon the wheel, the members 33, 16 and 17 are moved into the position shown in dotted lines in Fig. 1,—that is to say, with the member 33 engaging the tire. The wheel 1 is then caused to revolve slowly in a forward direction. The revolution of the wheel will bring the V-shaped portion of part 6 around until it passes the arms 16 and 17, which it does by carrying them outwardly, and substantially as soon as this has occurred, the hooks 13$^a$ will be in position so that the heads thereof will be engaged by the throat 6 of members which are upon the opposite sides of the wheel. The continued rotation of the wheel will cause the anti-skid device to be drawn onto the wheel,—the cable upon the edges thereof passing over the rolls 33$^b$ and onto the tire, and inasmuch as the cables which are on the lower edges of the anti-skid device must pass through the heads 20, 21. of the arms 16 and 17, the anti-skid device will be compelled to form itself over the tire.

It will be noted that the anti-skid device is cut away, as illustrated at 8$^a$ in Fig. 1, so as not to cover the jaws 7. The continued rotation of the wheel will eventually draw out all of the anti-skid device upon the wheel and provision is made such that the rear end of the anti-skid device will overlap the forward end by a few inches.

When the forward movement of the anti-skid device is in the position shown in Fig. 2,—that is to say, when the anti-skid device is upon the wheel, and the ratcheted members 14 and 15 are passing through the jaws 21, the head 28 will eventually be brought into contact with the jaws 20 of levers 16 and 17. When this occurs, the rod 32 which is carried by the member 28 is depressed by the engagement with the jaw 20, this engagement causing the member 30 to cam the tooth 29 out of engagement with the ratchet and releasing the same.

Just previous to this, the jaws 7 which have passed between the wheel and the levers 16 and 17 and have caused them to be spread, will receive the ratcheted member 15, because of the fact that when the levers 16 and 17 are drawn together by the action of the spring which joins them, as shown in Fig. 5, they will carry the ratchet members 15 against the jaws 7, with sufficient force to cause them to open and receive the ratcheted member 15. To facilitate this, the jaws 7 are slightly rounded, upon the outside or upon that side which is adjacent the ratchet member 15, thereby facilitating the entry of the ratcheted member 15. These jaws 7 upon the opposite sides of the wheel, will therefore hold the ends of the anti-skid device.

As the member 28 contacts with the jaw 20, the pivoted levers 22 will be cammed over the forward portion of the head, and engage in a groove 28$^a$ which is formed in the body of the head. This groove is rather wide, so as to allow some play, but it will be seen that the levers when engaging the groove, will hold the head 28 and prevent the head from returning to the casing 25.

When the foregoing operation has been accomplished, the members 33, 16 and 17 are elevated from their position adjacent the tire, and the wheel is free to run with the anti-skid device thereon.

When it is desired to remove the anti-skid device, the members which are pivoted at 23 are lowered so as to assume their original position adjacent the tire. and the wheel is slowly turned in a counter-clockwise direction.

The positioning of the levers 16 and 17 and the member 33 is such that the jaws 7 will first approach the heads 20, 21 of the levers 16 and 17, for it will be understood that the hook 13$^a$ or the head 6 cannot have any effect, inasmuch as they are covered by the overlapping portion of the anti-skid device.

As these jaws 7 approach the head 20, the ratcheted portion 15 will pass through the jaws of the head, and extend into the opening in the central portion of the head 28. This will cause the tooth 29 to engage with the ratcheted portion, for, under such circumstances, the head 28 will be pushed away from the head 20, provision for which, as previously explained, is made by enlarging the groove 28$^a$ in the head 28. As the jaws 7 approach the head 20, these jaws will engage with the spring pressed rods 22$^d$, which are carried by the head 20, and which at their forward ends are provided with cam surfaces adapted to engage with complementary surfaces upon the levers 22, thereby camming them out of engagement with the head 28, and releasing it, as shown in Fig. 3.

As the jaws 7 approach nearer to the head 20, the opening member 50 extends between these jaws, and the jaws are caused to ride up on the inclined portions of the opening member 50, thereby spreading them, and releasing the ratchet member 15.

Upon the sleeve 6, just ahead of the jaws 7 are cams 40, which are adapted to engage the heads 20 of levers 16, 17, to push them aside and permit the jaws 7 to pass. This camming action is, however, timed so that the jaws will release the ratcheted member 15, before the camming action is completed.

As soon as the jaws 7 have passed the heads of levers 16 and 17, the anti-skid device will be rapidly retrieved from the wheel, and into the case 25.

The last end of the anti-skid device when the same is retrieved, which, as will be understood, is the forward end when the device is put upon the wheel, will come into contact with the heads 20. In the last instance, as the anti-skid device is passing to its casing, and in order that the body portion of the anti-skid device may be entirely within the casing, I have extended the cables 12 and 13 beyond the ends of the anti-skid device, these then occupying the distance between the casing 25 and the heads 20 of the levers 16 and 17. The hooks 13$^a$ are provided with beads 13$^c$ at their inner portions, which are adapted to engage with the heads 20 and to limit the inward movement of the hooks 13$^a$. It will be understood that as these beads engage with the heads 20, and the wheel is continued in its counter-clockwise movement the flanged heads 13$^b$ will leave the throated portion of the member 6, at which time the anti-skid device is entirely free of the wheel. The lever 34 will thereupon be manipulated so as to raise the member 33 and the levers 16 and 17 from their position astride of the tire. Whereupon the wheel may move in the same manner as before the anti-skid device was introduced.

It may be that it will be desirable to permit some relative movement between the tire and the anti-skid device when the same is upon the tire, and for this purpose I have provided a construction which will permit relative movement (under certain conditions) between the frame 3 and sleeve 4.

A series of plungers 4$^a$ extend through openings in the lower part of sleeve 4 and normally coöperate with a series of depressions formed in the lower part of frame 3. These plungers 4$^a$ are supported upon a resilient member 4$^b$, whereby the plungers lock the sleeve 4 and frame 3 together.

The spring member 4$^b$ has one end fastened to sleeve 4 while the other end is free and lies in the path of movement of the lower jaw of the pair of jaws 7. When therefore this jaw is spread, due to the reception by the jaws of the ratcheted portions 14 and 15 of the anti-skid device, the spring member 4$^b$ is depressed and allows the plungers to drop from the recesses formed in frame 3, thereby permitting relative movement between the frame 3 and sleeve 4.

When the ratchet portions 14 and 15 of the anti-skid device leave the jaws 7, that is when the anti-skid device is being removed from the tire, the jaws 7 permit the spring member 4$^b$ to return to normal position and press the plungers 4$^a$ up against the frame 3. If the plungers do not seat in the depressions in frame 3, when pressed by spring member 4$^b$, it makes no difference, for when the anti-skid device is again put on the tire, and the hook 13$^a$ engages in the throat 6, the sleeve 4 will slide upon frame 3 until the plungers 4$^a$ come opposite the depressions in frame 3, at which time they will engage these depressions under the action of spring member 4$^a$.

If desired the inner portion of frame 3, throughout its length may be provided with indentations arranged in series, so as to lock the sleeve 4 in whatever position it may be when spring member 4$^a$ is released by jaws 7.

I do not wish to confine myself to the details of construction herein set forth, for undoubtedly various changes may be made without departing from the principle of operation embodied in my invention.

Having described my invention, what I claim is:

1. In a device of the character described, the combination with a vehicle body a wheel and tire thereon of an anti-skid device, a storage receptacle mounted upon the body to hold said device when the same is not in use, means with which the anti-skid device coöperates for introducing the anti-skid device to the tire, and means carried by the wheel adapted to receive and hold the anti-skid device upon the tire and free to rotate therewith.

2. In a device of the character described, the combination with a wheel and tire of an anti-skid device, means for supporting and holding said device when the same is not in use, means for introducing the anti-skid device to the tire operatively connected with the forward end of said anti-skid device, said means being adapted to be moved adjacent the wheel, receiving means on the wheel adapted to receive the forward end of the anti-skid device and draw said device onto the tire, and other means upon the wheel adapted to receive and hold the rear end of the anti-skid device.

3. In a device of the character described, the combination with a wheel and tire of an anti-skid device, means for supporting and holding the device when the same is not in use, means for introducing the anti-skid device upon the tire, and means carried by the wheel for receiving the anti-skid device and drawing the same upon the tire.

4. In a device of the character described, the combination with a wheel and tire, of an anti-skid device, engaging means carried by the forward end of the anti-skid device, engaging means carried by the wheel, and means for introducing the anti-skid device to the tire whereby the engaging means upon the wheel and anti-skid device may coöperate and the anti-skid device be drawn onto the wheel as the same is turned.

5. In a device of the character described, the combination with a wheel and tire, of an anti-skid device, means for supporting and holding the anti-skid device when the same is not in use, a yoke adapted to straddle the tire, engaging means carried by the forward end of the anti-skid device, and adapted to coöperate with the arms of the said yoke when the anti-skid device is not in use, said yoke being adapted to be moved adjacent to the opposite sides of the tire, means carried upon opposite sides of the wheel and adapted to engage with the engaging members carried by the anti-skid device, whereby when the wheel is turned the anti-skid device will be drawn onto the tire.

6. In a device of the character described, the combination of a wheel and tire, of an anti-skid device, engaging means carried by the forward and rear end of the anti-skid device, means for supporting and housing the anti-skid device when the same is not in use, means for introducing the anti-skid device upon the tire, and means carried by the wheel adapted to receive the engaging means upon the forward end of the anti-skid device and the engaging means upon the rear end of the anti-skid device.

7. In a device of the character described, the combination with a wheel and tire of an anti-skid device, means for supporting and housing the anti-skid device when the same is not in use, retrieving mechanism carried by the said housing and detachably secured to the rear end of the anti-skid device, means for introducing the anti-skid device upon the tire, engaging means upon the wheel and upon the anti-skid device adapted to coöperate when the anti-skid device is introduced to the tire, and means whereby the rear end of the anti-skid device is detached from the retrieving device when the anti-skid device is introduced upon the tire.

8. In a device of the character described, the combination with a wheel and tire of an anti-skid device, engaging members carried by the opposite sides at the forward end of the anti-skid device, means upon said wheel adapted to coöperate with the engaging means on the anti-skid device, engaging means carried by the rear end of the anti-skid device, means upon the wheel adapted to engage the said means on the anti-skid device, means for introducing the anti-skid device upon the tire, retrieving mechanism normally secured to the engaging means at the rear end of the anti-skid device, and means for disconnecting the retrieving device from the anti-skid device when the rear end of the anti-skid device comes upon the tire.

9. In a device of the character described, the combination with a wheel and tire of an anti-skid device, engaging members carried by the forward end of said anti-skid device, engaging members upon the wheel adapted to engage the engaging members upon the anti-skid device when the same is introduced upon the tire, engaging means at the rear end of the anti-skid device, means upon the wheel for coöperating with the engaging means at the rear end of the anti-skid device when the same is introduced upon the tire, said means comprising jaws which coöperate with the said engaging means, and means for introducing the anti-skid device upon the tire, said means being provided with a device for opening the aforesaid jaws when the wheel is turned in a direction to remove the anti-skid device from the tire, 10. In a device of the charatcer described, the combination of a wheel and tire, of an anti-skid device, said anti-skid device being provided with engaging members at the forward end thereof and engaging members at the rear portion thereof, a storage receptacle for the anti-skid device, a retrieving mechanism adapted when free to move to draw the anti-skid device within the storage receptacle, detachable means connecting the retrieving mechanism with the rear end of the anti-skid device, means for introducing the anti-skid device to the tire, and means upon the wheel for engaging the forward engaging members upon the anti-skid device.

11. In a device of the character described, the combination of a wheel and tire, of an anti-skid device, a storage receptacle for the anti-skid device, a retrieving mechanism associated with the storage receptacle and adapted to be secured to the rear end of the anti-skid device, a pair of arms adapted to extend upon opposite sides of the wheel and to introduce the anti-skid device to the tire, each of said arms being provided with means to guide the anti-skid device in its passage from the storage receptacle, a latch mechanism for holding the rear end of the anti-skid device to the retrieving mechanism, means for releasing said latch mechanism when the rear end of the anti-skid device comes to the arms before mentioned, and means upon the wheel for engaging the forward end of the anti-skid device to draw the same onto the tire.

12. In a device of the character described, the combination with a wheel and tire, of an anti-skid device, said device being provided with engaging members at the forward portion and rear portion thereof, a storage receptacle for the anti-skid device, a retrieving mechanism associated with the storage receptacle, latch mechanism for joining the holding means at the rear end of the anti-skid device with the retrieving mechanism, a pair of arms adapted to straddle the wheel for the purpose of introducing the anti-skid device to the tire, means upon the wheel adapted to engage the engaging members on the forward end of the anti-skid device to draw the same upon the tire, the said latch means which connects the anti-skid device and the retrieving device being adapted to operate to release the anti-skid device when the latch mechanism engages the above mentioned arm, and holding means carried by said arms adapted to engage portions of the retrieving mechanism to hold the same in position after they have engaged the said arms.

13. In a device of the character described, the combination with a wheel and a tire, of an anti-skid device, engaging means at the forward and rear ends of said anti-skid device, a storage receptacle adapted to hold the anti-skid device when the same is not in use, a retrieving mechanism associated with the storage receptacle adapted to draw the anti-skid device within the storage receptacle, latch mechanism joining the engaging members at the rear end of the anti-skid device with the retrieving mechanism, a pair of arms adapted to straddle the tire, said arms being adapted to introduce and guide the anti-skid device upon the tire, means upon the wheel for engaging the engaging members upon the forward end of the anti-skid device, said latch mechanism being adapted to eventually engage the arms above mentioned whereby the anti-skid device is released from the retrieving mechanism, jaws mounted upon the aforesaid arms adapted to engage portions of the retrieving mechanism to hold the same after they have engaged the arms, means carried by said arms for causing the said jaws to release, and means carried by the wheel adapted to engage the releasing means carried by the arms when the wheel is turned in a rearward direction.

14. In a device of the character described, the combination with a wheel of an anti-skid device, a storage receptacle for said device when the same is not in use, means for introducing the anti-skid device to the tire, means carried by the wheel adapted to receive and hold the anti-skid device upon the tire, and means for permitting the last mentioned means to have relative movement with respect to the wheel.

15. The combination with a vehicle body and ground wheel, of means on the wheel for mounting a chain and a chain carriage on said body movable to position adjacent the wheel to effect the placement of a chain from said carriage onto the wheel, or the removal of a chain therefrom.

16. The combination with a vehicle body, of a chain carriage, on the body, comprising a movable member and means on said member for releasing a chain from a wheel and transferring the chain to said member.

17. In apparatus of the character described, a tire chain comprising an end link having an anchor member thereon, and a ground wheel having an anchor member for coöperating with the member on the tire chain to automatically connect the parts.

18. The combination with a carriage, of a tire chain removably mounted on the carriage, a ground wheel, and means on the chain and wheel coöperative to transfer the chain from the carriage to the wheel and retain the chain on the wheel when the wheel is moved in one direction, and means on the carriage for returning the chain to the carriage when the wheel is moved in the other direction.

19. The combination with a carriage, of a tire chain removably mounted on the carriage, a ground wheel, and hook and anchor members on the chain and wheel coöperative to transfer the chain from the carriage to the wheel and retain the chain on the wheel.

20. The combination with a carriage, of a tire chain removably mounted on the carriage, a ground wheel, and hook and socket members on the chain and wheel coöperative to transfer the chain from the carriage to the wheel and retain the chain on the wheel.

In testimony whereof, I hereunto affix my signature in the presence of two witnesses.

WILLIAM T. LANGTON.

Witnesses:
A. J. HUDSON,
L. I. PORTER.